United States Patent
Chen

(10) Patent No.: US 9,475,736 B2
(45) Date of Patent: Oct. 25, 2016

(54) METHOD FOR FAST MANUFACTURING OF ORGANIC FERTILIZER

(71) Applicant: Wen Lo Chen, Taipei (TW)

(72) Inventor: Wen Lo Chen, Taipei (TW)

( * ) Notice: Subject to any disclaimer, the term of this patent is extended or adjusted under 35 U.S.C. 154(b) by 0 days.

(21) Appl. No.: 14/659,625

(22) Filed: Mar. 17, 2015

(65) Prior Publication Data

US 2016/0272552 A1     Sep. 22, 2016

(51) Int. Cl.
*C05F 11/00* (2006.01)
*C05F 17/00* (2006.01)

(52) U.S. Cl.
CPC ............ *C05F 17/0036* (2013.01); *C05F 11/00* (2013.01); *C05F 17/0063* (2013.01)

(58) Field of Classification Search
None
See application file for complete search history.

(56) References Cited

FOREIGN PATENT DOCUMENTS

| CN | 101239849 | * | 8/2008 |
| CN | 101284747 | * | 10/2008 |
| CN | 102603412 | * | 7/2012 |
| CN | 103964931 | * | 8/2014 |

* cited by examiner

*Primary Examiner* — Wayne Langel
(74) *Attorney, Agent, or Firm* — Leong C. Lei

(57) ABSTRACT

A method for fast manufacturing of organic fertilizer is a method utilizing the capability of super water soul of the quick deodorization, sterilization, catalysis, decomposition and transformation of natural plant stem fiber to generate abundant organic, and matters such as minerals and trace elements, and the characteristics of zeolite of the fast absorption and decomposition of harmful matters, the elimination of the sour and odor of corruptive organic matters and removal of toxic heavy metals, containing a composition formed of abundant minerals, extremely scarce trace elements in the cultivated soil of the surface of the earth at present and broken particles of kilned bricks together, and heating, stirring organic waste, decomposing, catalyzing it fast to become organic fertilizer containing a large content of trace elements.

6 Claims, No Drawings

METHOD FOR FAST MANUFACTURING OF ORGANIC FERTILIZER

(a) TECHNICAL FIELD OF THE INVENTION

The present invention relates to a method for manufacturing organic fertilizer fast and more efficiently.

(b) DESCRIPTION OF THE PRIOR ART

Fertilizer is an indispensable nutrient source for agriculture or gardening planting. Currently, most fertilizers are made by means of chemical technologies. However, to meet environmental protection and human's health requirements, organic fertilizer is adopted by workers in a certain specific fields of agriculture or gardening.

To manufacture conventional organic fertilizer, very much time is needed to stack organic solid waste and wait for fermentation thereof such that the production cost cannot be compared to chemical fertilizer.

SUMMARY OF THE INVENTION

The main object of the present invention is to provide a method for fast manufacturing of organic fertilizer, utilizing a stirrer to process organic solid waste with the appropriate adjustment of its carbon and nitrogen concentration ratio and water content and by way of a proper temperature treatment, and then adding a specific proportion of composition to promote it to be decomposed thoroughly so as to reduce the time for the formation of organic fertilizer.

The method of the present invention has the following steps:
1. breaking organic waste;
2. adjusting the carbon and nitrogen concentration ratio of the organic waste to be 20~30:1, the water content 50%~60%, and then overturning and stirring it in a stirrer continuously;
3. heating the organic waste in the stirrer from a normal temperature to a temperature in the range of 83° C. to 87° C. in one hour, and keeping it within the temperature range for 2 to 4 hours, and then decreasing the temperature thereof to approximately 50° C. to 60° C. and keeping it within the temperature range for 12 to 16 hours while overturning and stirring it continuously;
4. adding a composition formed of supper water soul, zeolite and broken kilned brick particles in the organic waste, the added amount of the composition is 3% to 10% of the total amount of the organic waste solid waste plus the composition;
5. stopping heating the organic waste and then increasing oxygen supply amount to the organic waste for a period of time continuously, allowing the organic waste and composition to be oxygenized and decomposed thoroughly faster to become organic fertilizer.

The super water soul mentioned above is a compound of a natural plant peptide and other rare minerals; the formation thereof is decomposing and transforming natural plant stem fibers into abundant minerals and microelements to manufacture one hundred percent water-soluble small molecule liquid in a free state, the small molecule liquid having enzyme characteristics without protein ingredient and being a unique co-enzyme, which can speed combination reaction with material in contact therewith, having catalysis and decomposition characteristics; the small molecule liquid is not influenced in a chemical reaction, and even better, can reduce chemicals to required elements and then absorb them; it is one and only one natural alkaline solution containing natural matters and minerals. The content is high base, low sulfur material, and the chemical compositions of the content are nutrients such as sodium, potassium, calcium, iron, magnesium and zinc plus minerals after analysis, the phytochemical compositions of which are trace elements such as alkaloids, saponins, glycosides after analysis. In addition, the small molecule liquid is dark golden brown with natural herbal flavor.

The PH value of the super water soul is 12.6, being only one natural alkaloid whose PH value is beyond 12, completely non-toxic, inorganic, sterile, and a substance capable of being used in a solution such as water, aldehydes, alcohols, phenols, aliphatic, or alcohol; the super water soul changes the basic structure of a substance, and makes the substance recombined; it breaks protein and tissue and recombine them into nano-metric small molecules so as to be able to absorb and decompose dirt and odor completely and easy to combine, catalyze and integrate with other substances. Furthermore, the super water soul has deodorant, anti-virus infection, composting accelerating, oil cutting functions, may be adjusted according to use, and can be used directly safely without toxicity. In addition, it can control the life of pathogens such as bacteria, fungi, viral, bacteria while being used on environment clean, sterilization and disinfection.

Super water soul can destroy harmful bacteria and has an affinity for beneficial bacteria; it is high temperature-resistant and can be mixed with chemicals; it is a solution without protein, capable of generating effects immediately upon application, and having no bad influence to environment. As to the use thereof, it can control offensive odor, repel insects with disease, inhibit the activity of harmful bacteria with diseases, shorten the fermentation process, and increase plant growth rates.

Since the theory extended from tea plant base crown ether (G·E) is the structure of sodium=potassium pump, referred to as sodium pump (the inverse concentration difference moves Na+ inside a cell out of the membrane thereof, and at the same, moves K+ outside the cell into the membrane thereof so as to keep the uneven ion distribution of the intracellular high Na+ and extracellular high Na+); the electric quantity of −90 MV generated therefrom can decompose organic substance or maintain the balance of the electric potential of cytochylema. The experiments for the characteristics thereof prove that it has the specific effects to environmental protection, disinfection to kill bacteria, deodorization, fast decomposition of organic matter, and etc.

《Analysis Data of Physical Properties of Super Water Soul》:
1. form: liquid
2. color: brown
3. specific weight: 1.236(27° C.)
4. viscosity: 2.914
5. boiling point: 103° C.
6. one hundred percent dissolution in water
7. scent: natural herbal flavor 《Analysis Data of Chemical Properties of Super Water Soul》
1. PH: 12.6
2. Na (mg/kg): 55,000
3. K (mg/kg): 1,300
4. Ca (mg/kg): 470
5. Fe (mg/kg): 97
6. Mg (mg/kg): 134

7. Zm (mg/kg): 42
8. Carbohydrate: trace
9. Saponins: trace

《Super Water Soul pH Value》

1:10-12.4; 1:50-11.6; 1:100-11.2

1:200-10.4; 1:300-10.2; 1:400-9.7; 1:500-9.5

The zeolite mentioned above is a natural mineral element. The characteristics thereof are:

having a strong adsorption performance, water absorbability, cation exchange capacity (CEC) of 160-185 meq/100 g;

having an excellent ability to absorb ammonia ($NH_3$), carbon dioxide ($CO_2$), hydrogen sulfide ($H_2S$) and hazardous substances, and excellent ability to break down odor;

having a high degree of capacity to prevent the loss of fertilizer, saving fertilizer use;

being good for water retention and ventilation, capable of keeping soil soft and improve the aggregate structure;

absorbing harmful gas in soil, preventing harmful gas from attaching to roots to cause putridity;

promoting root development, foliage strength, and preventing lodging and frost;

absorbing water and thus being not easy to cause crops to be frozen so as to prevent the damage of drought and frost;

preventing fertilizer to be too concentrated on crop and soil;

prevent the continuous cropping obstacle and trace element deficiency;

promoting crop, early maturity and quality;

Neutralizing acidic soil, stabilizing pH value, and having a deodorizing effect after fertilization;

after being used year after year, making the land become a good farmland containing minerals;

removing toxic heavy metals (uranium, aluminum, lead, mercury, arsenic, cadmium, . . . );

being stronger than chelating agent, increase enzyme function;

and capturing and removing virus and bacteria particles within organic waste.

Zleolite powder contains calcium, phosphorus, sodium, potassium, magnesium, zinc, copper, manganese and other elements, which are indispensable elements of biological. In addition, zeolite powder also contains titanium, nickel, molybdenum, selenium and other trace elements, these trace elements are extremely scarce in cultivated soil surface at present, but they all are activating substances inside animals' bodies, capable of increasing animals' activity greatly. In addition, zeolite powder also acts as a catalyst for some microbes within an organism so that it can improve the organism's absorption of nutrients and thus fertilizer remuneration. Further the particle size of the zeolite powder is 120 mesh or more, capable of being used as a carrier and stirring milling and decomposing organic matters.

《Chemical Composition of Zeolite (%)》

| $SiO_2$ | $Al_2O_3$ | $Fe_2O_3$ | $NaO_2$ | $CaO$ | $MgO$ | $K_2O$ |
|---|---|---|---|---|---|---|
| 60-70 | 13-14 | 1-1.8 | 0.5-15 | 1.5-3 | 0.8-2.6 | 0.1-0.3 |

DETAILED DESCRIPTION OF THE PREFERRED EMBODIMENTS

A method for fast manufacturing of organic fertilizer is detailed thereinafter; it has the steps as the followings:

1. breaking organic waste;

2. Adjusting the ratio of carbon and nitrogen concentration of the organic waste to 20 to 30:1 and the water content thereof to 50% to 60%, and then placing the organic waste into a stirrer for continuous overturning and stirring of the organic waste;

3. heating the organic waste in the stirrer from a normal temperature to a temperature ranged between 50° C.–60° C. in an hour, and keeping it at the temperature for 12 to 16 hours while keeping overturning and stirring it;

4. adding a composition formed of supper water soul, zeolite and broken kilned brick particles into the organic waste, the added amount of the composition is 3% to 10% of the total amount of the organic waste plus the composition; and 5. stopping heating the organic waste, and then increasing oxygen supply amount to the organic waste for a period of time continuously, allowing the organic waste and composition to be oxygenized and decomposed thoroughly faster to become organic fertilizer.

The composition in Step (4) is formed of zeolite of weight percentage of 70%-90% and super water soul of weight percentage of 30%40%.

In Step (5), mechanical agitation is used to continue overturning and stirring the organic waste and composition to increase oxygen supply.

In Step (5), fresh air may be poured in to increase oxygen supply.

In Step (5), the time of increasing oxygen is 11 to 13 hours.

In Step (5), 60%-80% of the organic waste and the composition together are allowed to be decomposed thoroughly to become organic fertilizer.

Additional advantages and modifications will readily occur to those skilled in the art. Therefore, the invention in its broader aspects is not limited to the specific details and representative embodiments shown and described herein. Accordingly, various modifications may be made without departing from the claims or scope of the general inventive concept as defined by the appended claims and their equivalents.

I claim:

1. A method for fast manufacturing of organic fertilizer, comprising the following steps:

1. breaking organic waste;

2. adjusting a ratio of carbon and nitrogen concentration of said organic waste to 20 to 30:1 and a water content thereof to 50% to 60%, and then placing said water waste into a stirrer for continuous overturning and stirring of said water waste;

3. heating said organic waste in said stirrer from a normal temperature to a temperature ranged between 50° C.~60° C. in an hour, and keeping said organic waste at said temperature for 12 to 16 hours while keeping overturning and stirring said organic waste;

4. adding a composition formed of super water soul, zeolite and broken kilned brick particles into said organic waste, an added amount of said composition is 3% to 10% of a total amount of said organic waste plus the composition; and 5. stopping heating said organic waste, and then increasing oxygen supply amount to said organic waste for a period of time continuously, allowing said organic waste and composition to be oxygenized and decomposed thoroughly faster to become organic fertilizer.

2. The method according to claim 1, wherein mechanical agitation is used to continue overturning and stirring said organic waste and composition to increase oxygen supply.

3. The method according to claim 1, wherein fresh air is poured in to increase oxygen supply.

4. The method according to claim 2, wherein the time of increasing oxygen is 11 to 13 hours.

5. The method according to claim 1, wherein 60%-80% of said organic waste and said composition together are allowed to be decomposed thoroughly to become organic fertilizer.

6. The method according to claim 3, wherein the time of increasing oxygen is 11 to 13 hours.

* * * * *